US010890483B2

(12) United States Patent
Wakuda

(10) Patent No.: US 10,890,483 B2
(45) Date of Patent: Jan. 12, 2021

(54) INFRARED SPECTROPHOTOMETER

(71) Applicant: SHIMADZU CORPORATION, Kyoto (JP)

(72) Inventor: Shinya Wakuda, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 260 days.

(21) Appl. No.: 16/088,660

(22) PCT Filed: Jun. 3, 2016

(86) PCT No.: PCT/JP2016/066619
§ 371 (c)(1),
(2) Date: Sep. 26, 2018

(87) PCT Pub. No.: WO2017/208439
PCT Pub. Date: Dec. 7, 2017

(65) Prior Publication Data
US 2020/0300698 A1 Sep. 24, 2020

(51) Int. Cl.
G01J 3/10 (2006.01)
G01N 3/02 (2006.01)
G01J 3/02 (2006.01)

(52) U.S. Cl.
CPC ............ G01J 3/108 (2013.01); G01J 3/027 (2013.01)

(58) Field of Classification Search
CPC .................... G01J 3/108; G01J 3/027
See application file for complete search history.

(56) References Cited

U.S. PATENT DOCUMENTS 8,593,078 B1    11/2013  Xiong
2004/0217306 A1*  11/2004  Curbelo ............... G01J 3/108
                                                250/504 R
(Continued)

FOREIGN PATENT DOCUMENTS

JP    H09-184759    12/1995
JP    10-160568     6/1998
(Continued)

OTHER PUBLICATIONS

PCT/JP2016/066619, International Search Report and Written Opinion, dated Aug. 23, 2016, 2 pages—Japanese, 2 pages—English.
(Continued)

Primary Examiner — Taeho Jo
(74) Attorney, Agent, or Firm — Andrew F. Young, Esq.; Nolte Lackenbach Siegel

(57) ABSTRACT

An infrared spectrophotometer uses a configuration that allows notification of the appropriate replacement time for an electric heater. The infrared spectrophotometer is provided with an electric heater 1, a PWM control circuit 5, a state detection unit 61, and a notification processing unit 62. The electric heater 1 is a light source that irradiates infrared radiation. The PWM control circuit 5 carries out PWM control so that the current supplied to the electric heater 1 is constant. The state detection unit 61 detects the state of the electric heater 1 on the basis of the variation in the duty cycle during PWM control. The notification processing unit 62 reports the result of the detection by the state detection unit 61.

4 Claims, 5 Drawing Sheets

(56) References Cited

U.S. PATENT DOCUMENTS

| | | | | |
|---|---|---|---|---|
| 2006/0092414 A1* | 5/2006 | Geshwind | ............... | G01J 3/36 |
| | | | | 356/310 |
| 2007/0078348 A1* | 4/2007 | Holman | ............... | A61B 5/0075 |
| | | | | 600/473 |
| 2010/0148083 A1* | 6/2010 | Brown | ............... | G01J 3/26 |
| | | | | 250/372 |
| 2015/0013035 A1* | 1/2015 | Humphris | ............... | G01Q 10/00 |
| | | | | 850/1 |
| 2015/0219684 A1* | 8/2015 | Humphris | ............... | G01Q 20/02 |
| | | | | 850/1 |
| 2015/0300944 A1* | 10/2015 | Pelletier | ............... | E21B 49/08 |
| | | | | 356/436 |
| 2016/0161294 A1* | 6/2016 | Ip | ............... | G01J 1/42 |
| | | | | 250/578.1 |
| 2017/0176904 A1* | 6/2017 | Kimura | ............... | H02M 7/46 |

FOREIGN PATENT DOCUMENTS

| | | |
|---|---|---|
| JP | 11-84957 | 3/1999 |
| JP | 2001-109123 | 4/2001 |
| JP | 2006-258521 | 9/2006 |
| JP | 2011-253783 | 12/2011 |
| JP | 2012-3864 | 1/2012 |

OTHER PUBLICATIONS

PCT/JP2016/066619, Written Opinion dated Aug. 15, 2018, 6 pages—Japanese, 1 page—English.
JP 2018-520318, Office Action dated May 27, 2019, 4 pages—Japanese, 3 pages—English.

\* cited by examiner

INFRARED SPECTROPHOTOMETER

CROSS REFERENCE TO RELATED APPLICATIONS

This application relates to, and claims priority from, Ser. No.: PCT/JP2016/066619 filed Jun. 3, 2016, the entire contents of which are incorporated herein by reference.

FIGURE SELECTED FOR PUBLICATION

FIG. 1

BACKGROUND OF THE INVENTION

Field of the Invention

The present invention relates to an infrared spectrophotometer comprising an electric heater as an infrared light emission source.

Description of the Related Art

With respect to the infrared spectrophotometer, an electric heater such as a ceramic heater is applied thereto as a light source (e.g., Patent Document 1). With respect to such a kind of infrared spectrophotometer, the infrared light emitted from the electric heater reflects from the fixed mirror and the movable mirror, so that the light reflected from the fixed mirror and the light reflected from the movable mirror interfere each other and then, the interfering light is radiated to a sample.

The ceramic heater comprises an electric heating element made of the resistive element, of which the outer surface is covered with a ceramic such as silicon carbide (SiC) or silicon nitride (SiN). Whereas the electric heating element deteriorates in a short period of time due to oxidation given the electric heating element is used alone, the oxidation of the electric heating element is suppressed when the outer surface thereof is covered with the ceramic and, as a result, the durability thereof improves.

PRIOR ART DOCUMENTS

Patent Document 1: JP Patent Published H10-160568

ASPECTS AND SUMMARY OF THE INVENTION

Problems to be Solved by the Invention

While being used for a long time despite such a ceramic heater, the ceramic covering per se is gradually oxidized, so that the inside electric heating element per se is gradually oxidized and becomes thin, and then breaks at last. Given When the electric heating element breaks, the ceramic heater per se must be replaced, so that it is problematic that an analysis using the instant infrared spectrophotometer is out of order until replacement thereof is completed.

Therefore, in general, the lifetime of the ceramic heater is indicated by monitoring such as the operating time of the ceramic heater or detecting and monitoring the irradiated light with the light detector. Therefore, the ceramic heater might be replaced before the electric heating element breaks down by predicting the lifetime of the ceramic heater.

Whereas the operating time of the ceramic heater is monitored in such an aspect, it is still a problem that the user cannot be aware of the lifetime of each ceramic heater, heater-by-heater. Specifically, the lifetime of each ceramic heater is different from one another, so that any ceramic heater must be replaced whenever the predetermined time for replacement comes first before the predicted shortest lifetime passes. Therefore, the ceramic heater well before the lifetime is over, is likely replaced.

On the other hand, according to the aspect of monitoring the light radiated from the ceramic heater, the ceramic heater is replaced when the amount of the light becomes below the predetermined threshold value. In such a case, whereas the user can be aware of the lifetime of each ceramic heater, the light detector to detect the light radiated from the ceramic heater is mandatory, so that it is concerned about that the product cost and the production cost become much higher.

The present invention is initiated considering such circumstances and the purpose of the present invention is to provide an infrared spectrophotometer that notifies the appropriate replacement time of the electric heater despite an inexpensive way.

Means for Solving the Problem (1) An infrared spectrophotometer of the present invention comprises: an electric heater; an (electric) current control element; a state detection circuit; and a notification (alarm) processing unit. The electric heater is the light source that radiates an infrared light. The current control element conducts PWM (pulse-width modulation) control so that the current supply to the electric heater is constant. The state detection circuit detects the state of the electric heater based on duty cycle variation on performing the PWM control. The notification processing unit notifies the detection result with the state detection circuit.

According to such an aspect, the PWM controls the current supply so that the current supplied to the electric heater is constant. In such a case, when the electric heater deteriorates due to such as oxidation and the resistance value becomes high, the duty cycle during the PWM control is large. Accordingly, given the state (deterioration level) of the electric heater is detected, the detection result can be notified based on the variation of duty cycle. Accordingly, the appropriate replacement time of the electric heater can be notified using an inexpensive structure compared to the structure in which the light detector is installed.

(2) The state detection circuit may detect the state of the electric heater by comparing the duty cycle during the PWM control to the threshold value.

According to such an aspect, the state of the electric heater is detected by comparison between the duty cycle during the PWM control and the threshold value and then, the detected result thereof is notified. Specifically, when the duty cycle is higher than the threshold value, it is determined that the electric heater is deteriorated due to such as oxidation and that the resistance value is high, so that the appropriate replacement timing of the electric heater can be notified based on the detection result thereof.

(3) The state detection circuit may detect the state of the electric heater based on a variation amount of the duty cycle (on-duty) during the PWM control.

According to such an aspect, the state of the electric heater is detected by comparison between the variation amount of the duty cycle during the PWM control and the threshold value and then, the detected result thereof is notified. Specifically, when the variation amount of the duty cycle is higher than the threshold value, it is determined that the electric heater is deteriorated due to such as oxidation and that the resistance value is high, so that the appropriate replacement timing of the electric heater can be notified based on the detection result thereof.

(4) The state detection circuit may detect the state of the electric heater at the predetermined time after the PWM control starts.

According to such an aspect, when the duty cycle becomes stable, and then the predetermined time passes following starting the PWM control, the state of the electric heater is detected based on the variation of the duty cycle. Accordingly, the state of the electric heater is precisely detected, the replacement timing of the electric heater can be more adequately notified.

Effect of the Invention

According to the aspect of the present invention, it is feasible to detect the state (deteriorated state) of the electric heater based on the variation of the duty cycle and notify the result thereof, so that the appropriate replacement timing of the electric heater can be notified using the inexpensive structure compared to the structure in which the light detector is installed.

The above and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
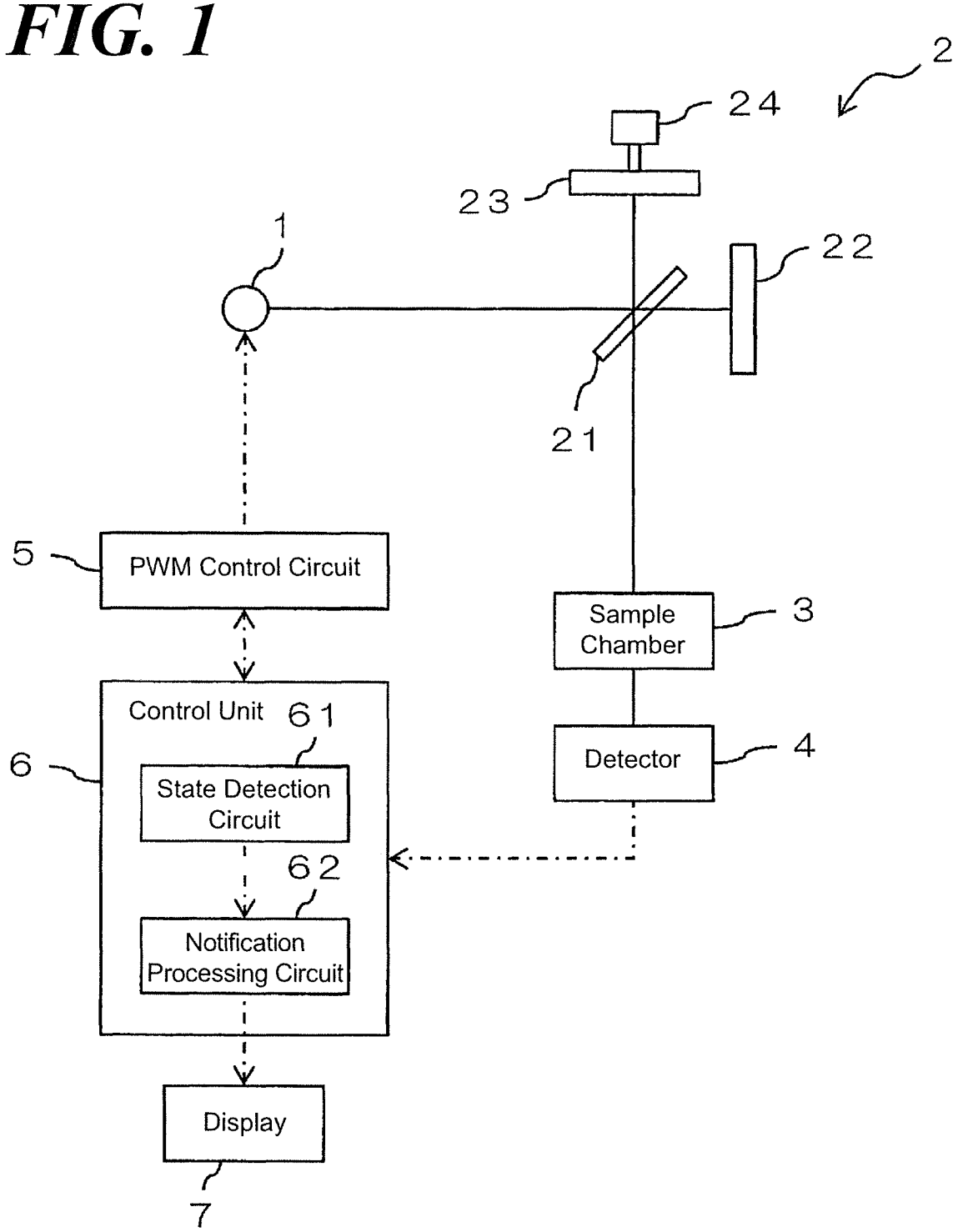
FIG. 1 is a schematic view illustrating an example of the structure of an infrared spectrophotometer according to the aspect of the Embodiment 1 of the present invention.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent.

1. Structure of the Infrared Spectrophotometer

FIG. 1 is a schematic view illustrating an example of the structure of an infrared spectrophotometer according to the aspect of the Embodiment of the present invention. Such an infrared spectrophotometer is e.g., Fourier Transform Infrared Spectrophotometer (FT-IR) and comprises an electric heater 1, an interferometer 2, a sample chamber 3, a detector 4, a PWM control circuit 5, a control unit 6 and a display 7 and so forth.

The electric heater 1 comprises e.g., a ceramic heater. Specifically, the electric heater 1 is formed by covering the outer surface of an electric heating element, made of the resistive element, with a ceramic such as silicon carbide (SiC) or silicon nitride (SiN). Such a heating element is a metal heating element including e.g., nickel-chrome alloy, ferrous-chrome-aluminum alloy, molybdenum, tungsten, platinum, molybdenum disilicide and so forth, but not limited thereto and can be a nonmetal heating element. The electric heater 1 is made by mixing the ceramic and a metal powder such as chrome, covering-sintering the outside surface of the heating element.

On an analysis, the current flows in the electric heater 1, and whereby the infrared light is emitted from the electric heater 1. Specifically, the electric heater 1 functions as the light source that radiates an infrared light. The infrared light emitted from the electric heater 1 becomes an interfering light at the interferometer 2, which is irradiated as the light for measurement to the sample in the sample chamber 3.

The interferometer 2 comprises a half mirror 21, a fixed mirror 22 and a movable mirror 23 and so forth. A part of the infrared light emitted from the electric heater 1 transmits the half mirror 21 and is incident to the fixed mirror 22, and the rest of the infrared light is reflected from the half mirror 21 and is incident to the movable mirror 23. The fixed mirror 22 is fixed at the specified (predetermined) distance from the half mirror 21. On the other hand, the distance between the movable mirror 23 and the half mirror 21 is changed by driving the driving element 24.

The incident infrared lights to the fixed mirror 22 and the movable mirror 23 are reflected from the respective reflection surface and incident again to the half mirror 21. Now, the reflected light from the fixed mirror 22 is reflected from the half mirror 21 and the reflected light from the movable mirror 23 transmits the half mirror 21, so that the respective lights are guided into the sample chamber 3 through the same light-path. As a result, each infrared light from the fixed mirror 22 and the movable mirror 23 interferes with each other, and the interfering light thereby is radiated to the sample in the sample chamber 3.

The interfering light from the interferometer 2 is reflected from the sample or transmits the sample in the sample chamber 3 and then, is incident to the detector 4. The detector 4 is constructed from e.g., MCT (HgCdTe) detector. The detector 4 outputs the interferogram as a detection signal corresponding to the incident light to the control unit 6. The control unit 6 obtains the spectral data by converting the interferogram input from the detector 4 to the Fourier-transform.

The PWM control circuit 5 executes an PWM (pulse-width modulation) control on the current relating to the electric heater 1. The control unit 6 comprises a CPU (central processing unit) and functions as the state detection circuit 61 and the notification processing unit 62 when the CPU runs the program. The state detection circuit 61 detects the state of the electric heater 1 based on an input signal from the PWM control circuit 5. The notification processing unit 62 notifies the user by displaying the detection result provided from the state detection circuit 61 on the display 7. The display 7 comprises e.g., a liquid crystal display.

2. Structure of the PWM Control Circuit

Figure 2:
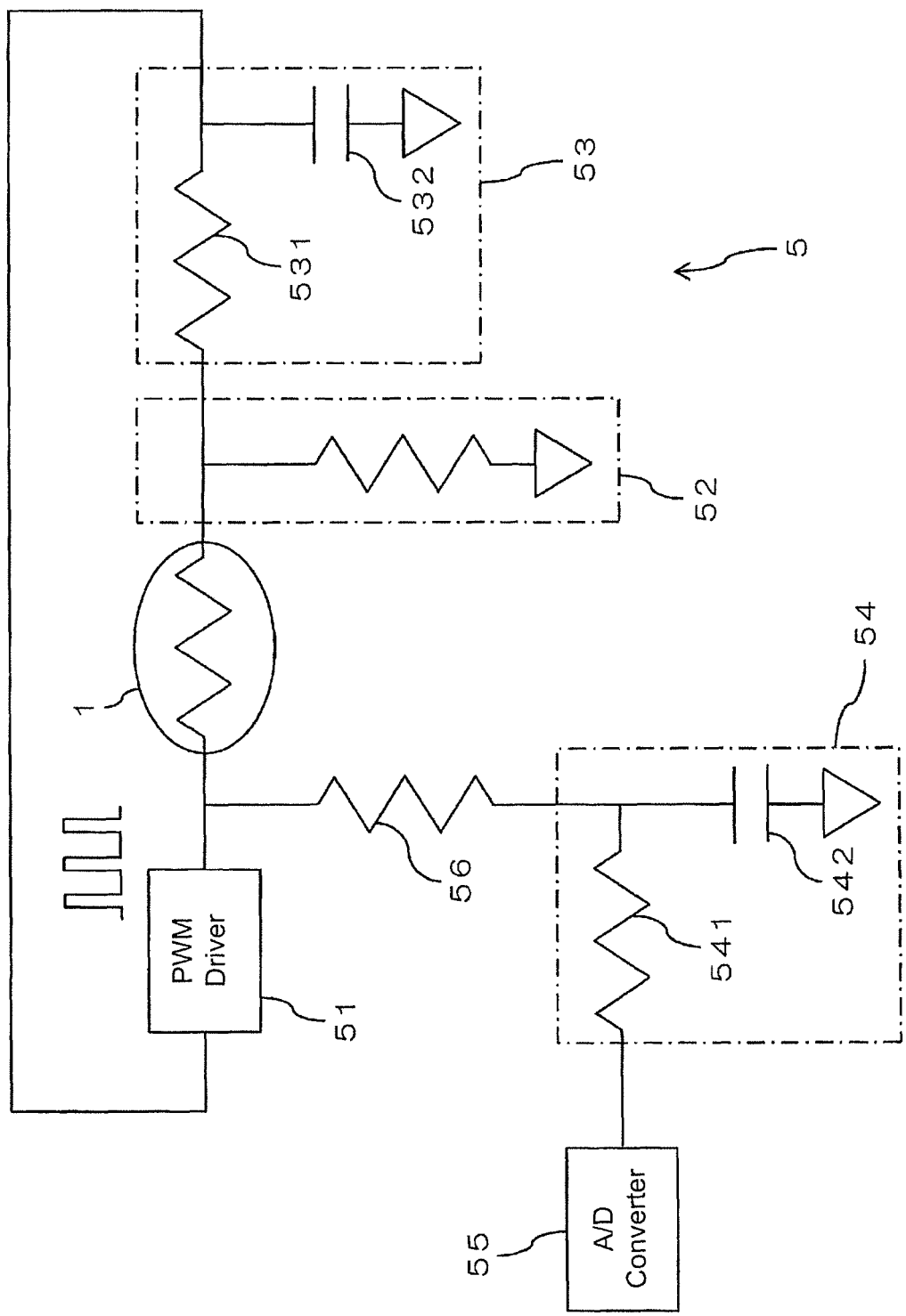
FIG. 2 is a schematic view illustrating an example of the structure of a PWM control circuit.

FIG. 2 is a circuit diagram illustrating an example of the structure of a PWM control circuit 5. The PWM circuit comprises a PWM driver 51, a light source detector 52, low pass filters 53, 54 and an A/D converter 55 and so forth.

The PWM driver 51 outputs the driving voltage, as a pulse signal at a constant frequency, of the electric heater 1 as the light source. The PWM driver 51 changes the time pulse (pulse width) output at the constant frequency, so that the current amount to the electric heater 1 becomes controllable.

The light source current detector 52 detects the current flowing in the electric heater 1. The low pass filter 53 comprises a resistor 531 and a condenser 532, wherein the condenser 532 smooths the signal from the light source detector 52 and the low pass filter 53 performs feedback by which DC component (direct current component) returns to the PWM driver 51. The PWM driver 51 functions as a current controller that performs the PWM control so that the supplied current to the electric heater 1 is constant based on the feedback signal from the light source current detection circuit 52.

The low pass filter 54 is connected in between the PWM driver 51 and the electric heater 1 through the resistor 56. The low pass filter 54 comprises a resistor 541 and a condenser 542, wherein the voltage of the input signal to the low pass filter 54 is divided by the resistor 56 and resistor 541. The duty cycle on performing the PWM control with the PWM driver 51 is input into the control unit 6 from the A/D converter 55 through the low pass filter 54.

3. PWM Control and Duty Cycle

Figure 3A:
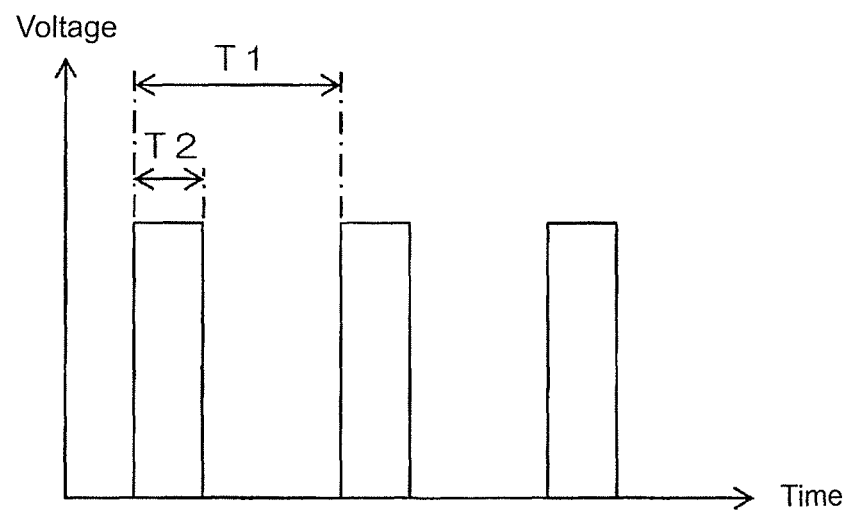
FIG. 3A is a view illustrating an aspect of the PWM control with the PWM driver.
Figure 3B:
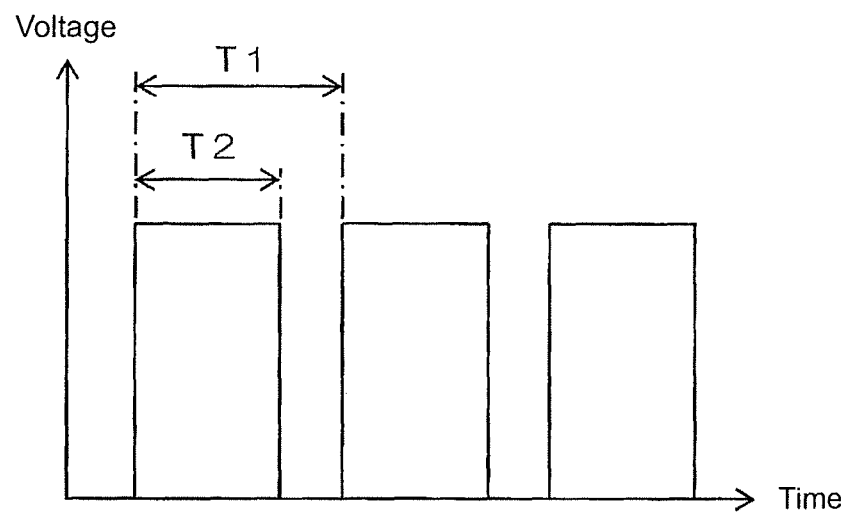
FIG. 3B is a view illustrating an aspect of the PWM control with the PWM driver.

FIGS. 3A, 3B are views illustrating an aspect of the PWM control with the PWM driver 51. Referring to FIGS. 3A, 3B, PWM control is performed by changing the duty cycle (T2/T1) that is the ratio (or percentage) between a constant cycle T1 (or pulse width) and the time (on) T2 (the period while the signal is on). Specifically, such a control is an adjustment in which the time T2 is adjusted to provide the electric heater 1 with a constant power supply based on that the cycle T1 is constant.

Referring to FIG. 3B, when the electric heater 1 deteriorates due to such as oxidation, and the resistance value becomes high due to increase of $SiO_2$, the duty cycle (T2/T1) during the PWM control becomes large. Now, according to the aspect of the present Embodiment, the state detection circuit 61 of the control unit 6 detects the state (deterioration state) of the electric heater 1 followed by notifying the detection result from the notification processing unit 62. Accordingly, the appropriate replacement timing of the electric heater 1 can be notified timely despite using an inexpensive structure of the low pass filter 54.

4. Notification of Timing (Time) for Replacing the Electric Heater

Figure 4:
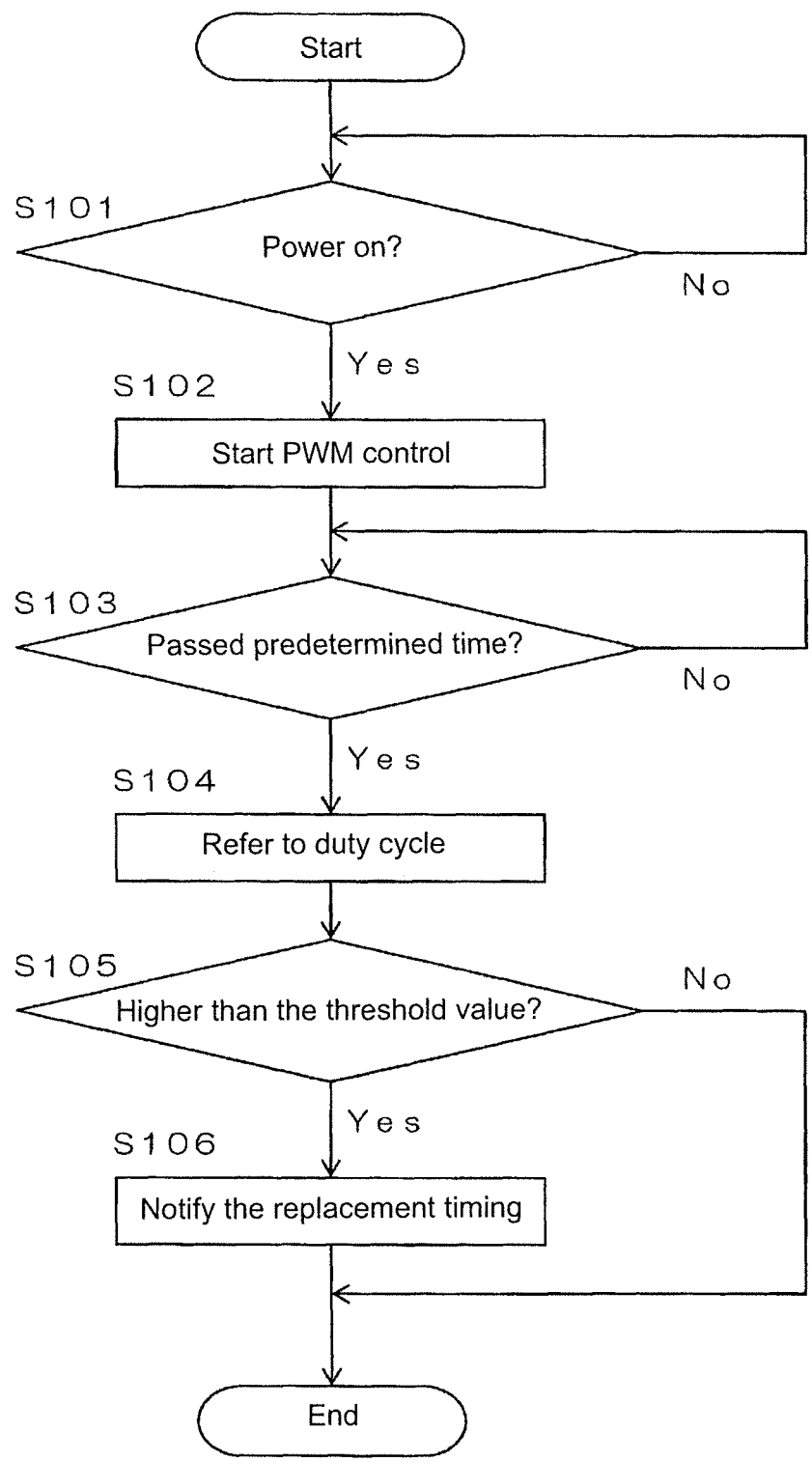
FIG. 4 is a flowchart illustrating an Embodiment of process by the control unit when a replacement timing of the electric heater is notified.

FIG. 4 is a flowchart illustrating an Embodiment of a processing with the control unit 6 when the replacement timing of the electric heater 1 is notified. The PWM control of the current with respect to the electric heater 1 starts e.g., the power source of the infrared spectrophotometer turns on (step S101, S102).

The duty cycle is not stable right after the PWM control starts due to rising temperature of the electric heater 1. Therefore, the state detection circuit 61 is inoperative for detection until passing a predetermined time from the beginning of the PWM control and then, the state detection circuit 61 starts detection of the state of the electric heater 1 after the above predetermined time passes (step S103 is Yes).

Specifically, referring to the duty cycle value input from the PWM control circuit 5 (step S104), such a value is compared to the threshold value (step S105). Then, when the duty cycle value is higher than the threshold value (step S105 is Yes), the display 7 displays such a detection result and the replacement timing of the electric heater 1 is notified to the user (step S106). Such a detection with the state detection circuit 61 can be repeatedly carried out during the PWM control of the current with respect to the electric heater 1.

As set forth above, according to the aspect of the present Embodiment, the state of the electric heater 1 is detected by comparison between the duty cycle during the PWM control and the threshold value and then, the detected result thereof is notified. Specifically, when the duty cycle is higher than the threshold value (step S105 is Yes), it is determined that the electric heater 1 is deteriorated due to such as oxidation and that the resistance value is high, so that the appropriate replacement timing of the electric heater 1 can be notified based on the detection result thereof.

In addition, when the duty cycle becomes stable (step S103 is Yes) following passing the predetermined time after the PWM control starts, the state of the electric heater 1 is detectable based on the variation of the duty cycle thereof. Accordingly, the state of the electric heater 1 is precisely detected, so that the replacement timing of the electric heater can be more adequately notified.

5. Flow Chart

Figure 5:
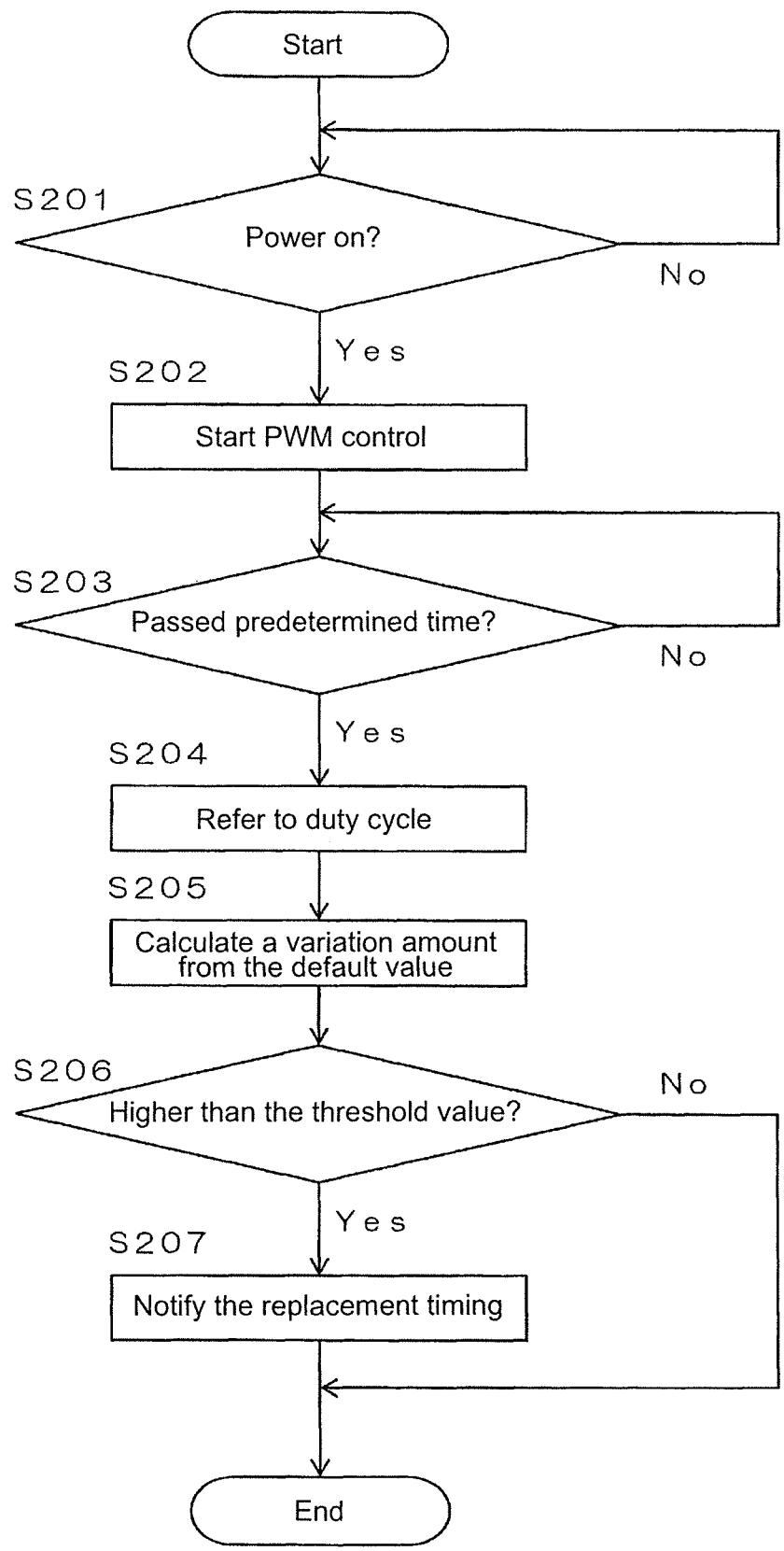
FIG. 5 is a flowchart illustrating an alternative Embodiment by the control unit when a replacement timing of the electric heater is notified.

FIG. 5 is a flowchart illustrating an alternative Embodiment with respect to the processing with the control circuit when a replacement timing of the electric heater 1 is notified. As well as the Embodiment set forth above, the PWM control of the current with respect to the electric heater 1 starts, when e.g., the power source of the infrared spectrophotometer turns on (step S201, S202). The state detection circuit 61 detects the state of the electric heater 1 following passing the predetermined time (step S203 is Yes) after the PWM control starts.

Specifically, referring to the value of duty cycle input from the PWM control circuit 5 (step S204), the variation amount from the default value of the duty cycle, which is stored in the memory storage (not shown in FIG.) in advance is calculated (step S205). Such an above default value is the value of duty cycle before the deterioration of the electric heater 1 begins and, for example, corresponds to the value of duty cycle when the new electric heater 1 is used. The value of duty cycle gradually increases along with the use period of the electric heater 1, so that the above variation amount can be calculated by conducting an operation in which the default value is subtracted from the value of duty cycle input from the PWM control circuit 5.

Following the above operation, the calculated variation amount of the duty cycle is compared to the threshold value (step S206). Then, when the variation amount of the duty cycle is higher than the threshold value (step S206 is Yes), the display 7 displays such a detection result and the incident in which the electric heater 1 is now at the replacement timing is notified to the user (step S207). Such a detection with the state detection circuit 61 can be repeatedly carried out during the PWM control of the current with respect to the electric heater 1.

As set forth above, according to the aspect of the alternative Embodiment, the state of the electric heater 1 is detected by comparing the variation amount of the duty cycle during the PWM control with the threshold value and then, the detected result thereof is notified. Specifically, when the duty cycle is higher than the threshold value (step S206 is Yes), it is determined that the electric heater 1 is deteriorated due to such as oxidation and that the resistance value is high, so that the appropriate replacement timing of the electric heater 1 can be notified based on the detection result thereof.

In addition, when the duty cycle becomes stable (step S203 is Yes) following passing the predetermined time after the PWM control starts, the state of the electric heater 1 is detectable based on the variation of the duty cycle thereof. Accordingly, the state of the electric heater 1 is precisely detected, so that the replacement timing of the electric heater 1 can be more adequately notified.

Another Alternative Embodiment

According to the aspect of the Embodiment set forth above, the inventor sets forth that the notification processing unit 62 notifies the user by displaying the detection result provided from the state detection circuit 61 on the display 7. However, the present invention is not limited to such an aspect, for example, the notification processing circuit 62 performs such a notification using such as voice (sound) other than the display.

In addition, according to the aspect of the present Embodiment, the electric heater 1 is the ceramic heater, but the heater can be the other kind of heater than the ceramic heater as long as the electric heater 1 is available for the light source that emits infrared light. In such case, the electric heater can be an electric heater made of just a heating element, e.g., a resistive element, of which outside is not covered with ceramic.

REFERENCE OF SIGN

1 Electric heater;
2 Interferometer
3 Sample chamber
4 Detector
5 PWM control circuit
6 Control unit
7 Display
51 PWM driver
52 Light source current detector
53 Low pass filter
54 Low pass filter
55 A/D converter
56 Resistor
61 State detection circuit
62 Notification processing unit
531 Resistor
532 Condenser
541 Resistor
542 Condenser It will be further understood by those of skill in the art that the apparatus and devices and the elements herein, without limitation, and including the sub components such as operational structures, circuits, communication or data pathways, and related elements, control circuits/elements and detection circuits/elements of all kinds, display circuits and display systems and elements, any necessary driving elements, inputs, sensors, detectors, memory elements, processors and any combinations of these structures etc. as will be understood by those of skill in the art as also being identified as or capable of operating the systems and devices and subcomponents noted herein and structures that accomplish the functions without restrictive language or label requirements since those of skill in the art are well versed in related Infrared Spectrophotometer devices, including any computer and operational controls and technologies of such spectrophotometer devices and all their sub components, including various circuits, elements and combinations of circuits, elements without departing from the scope and spirit of the present invention.

Although only a few embodiments have been disclosed in detail above, other embodiments are possible and the inventors intend these to be encompassed within this specification. The specification describes certain technological solutions to solve the technical problems that are described expressly and inherently in this application. This disclosure describes embodiments, and the claims are intended to cover any modification or alternative or generalization of these embodiments which might be predictable to a person having ordinary skill in the art.

Those of skill would further appreciate that the various illustrative logical blocks, modules, circuits, and algorithm steps described in connection with the embodiments disclosed herein may be implemented as electronic hardware, computer software running on a specific purpose machine that is programmed to carry out the operations described in this application, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

The various illustrative logical blocks, modules, and circuits described in connection with the embodiments disclosed herein, may be implemented or performed with a general or specific purpose processor, or with hardware that carries out these functions, e.g., a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has an internal bus connecting to cards or other hardware, running based on a system BIOS or equivalent that contains startup and boot software, system memory which provides temporary storage for an operating system, drivers for the hardware and for application programs, disk interface which provides an interface between internal storage device(s) and the other hardware, an external peripheral controller which interfaces to external devices such as a backup storage device, and a network that connects to a hard wired network cable such as Ethernet or may be a wireless connection such as a RF link running under a wireless protocol such as 802.11. Likewise, an external bus may be any of but not limited to hard wired external busses such as IEEE-1394 or USB. A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, using cloud computing, or in combinations. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of tangible storage medium that stores tangible, non-transitory computer based instructions. An exemplary storage medium is coupled to the processor such that the processor can read information from, and write information to, the storage medium. In the alternative, the storage medium may be integral to the processor. The processor and the storage medium may reside in reconfigurable logic of any type.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a web site. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Also, the inventors intend that only those claims which use the words "means for" are intended to be interpreted under 35 USC 112 only when the word 'means' and 'for' are used together, next to each other in the form of "means for", and not otherwise. Moreover, no limitations from the specification are intended to be read into any claims, unless those limitations are expressly included in the claims.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. An infrared spectrophotometer, comprising:
an electric heater that is a light source that emits an infrared light;
a current control circuit that conducts a pulse-width modulation (PWM) control so that a current supply to said electric heater is constant;
a detector that detects a variation of a duty cycle while performing said pulse-width modulation (PWM) control;
a state detection circuit that detects a deterioration level of said electric heater based on an output from the detector; and
a notification processing unit that notifies upon a detection result of the deterioration level of said electric heater with said state detection circuit.

2. An infrared spectrophotometer, according to claim 1, wherein:
said state detection circuit detects the deterioration level of said electric heater by further comparing said duty cycle while performing said PWM control and a first threshold value.

3. An infrared spectrophotometer, according to claim 1, wherein:
said state detection circuit detects the state of said electric heater by further comparing a variation amount of said duty cycle while performing said PWM control and a second threshold value.

4. An infrared spectrophotometer, according to claim 1, wherein:
said state detection circuit further detects the state of said electric heater following a passing a predetermined time after said PWM control starts.

* * * * *